United States Patent
Hatch et al.

(10) Patent No.: US 9,309,978 B2
(45) Date of Patent: Apr. 12, 2016

(54) LOW HEAD TO STEM RATIO POPPET VALVE

(71) Applicants: Glenn D. Hatch, Corning, NY (US); Joel T. Sanford, Bath, NY (US)

(72) Inventors: Glenn D. Hatch, Corning, NY (US); Joel T. Sanford, Bath, NY (US)

(73) Assignee: Dresser-Rand Company, Olean, NY (US)

(*) Notice: Subject to any disclaimer, the term of this patent is extended or adjusted under 35 U.S.C. 154(b) by 114 days.

(21) Appl. No.: 14/202,008

(22) Filed: Mar. 10, 2014

(65) Prior Publication Data

US 2015/0252909 A1 Sep. 10, 2015

Related U.S. Application Data

(60) Provisional application No. 61/781,655, filed on Mar. 14, 2013.

(51) Int. Cl.
*F16K 15/00* (2006.01)
*F16K 15/02* (2006.01)

(52) U.S. Cl.
CPC .......... *F16K 15/028* (2013.01); *Y10T 137/7925* (2015.04); *Y10T 137/7931* (2015.04)

(58) Field of Classification Search
CPC ............ F16K 15/028; Y10T 137/7925; Y10T 137/7931
USPC ......... 137/512.2, 538, 540, 533.21, 469, 528, 137/471; 251/170, 174, 321; 417/60, 256, 417/298
See application file for complete search history.

(56) References Cited

U.S. PATENT DOCUMENTS

| | | | | |
|---|---|---|---|---|
| 609,726 A | * | 8/1898 | De C Ball | F16K 47/00 137/514.3 |
| 2,094,951 A | * | 10/1937 | Kowan | F04B 39/1013 137/512 |
| 3,148,697 A | * | 9/1964 | Carr | F04B 39/1006 137/327 |
| 3,626,975 A | * | 12/1971 | Bobst | F16K 17/0433 137/469 |
| 4,872,481 A | * | 10/1989 | Shaw | F16K 1/42 137/512.1 |
| 2001/0039966 A1 | * | 11/2001 | Walpole | F04B 39/1053 137/512.1 |
| 2010/0090149 A1 | * | 4/2010 | Thompson | F04B 39/1013 251/321 |
| 2011/0076171 A1 | * | 3/2011 | Park | F04B 27/1018 417/571 |

* cited by examiner

*Primary Examiner* — Marina Tietjen
*Assistant Examiner* — Umashankar Venkatesan
(74) *Attorney, Agent, or Firm* — Edmonds & Nolte, PC (57) ABSTRACT

A valve member for a poppet valve is provided. The valve member may include a valve stem, a valve head, a face formed on the valve head, a sealing surface disposed between the face and the perimeter of the valve head, a tapered socket, and a bevel. The valve stem may include an outside surface defining a stem diameter. The valve head may include a maximum diameter greater than the stem diameter. The face may be formed on the valve head opposite the valve stem. The sealing surface may include a transition ring disposed between the perimeter of the face and the maximum diameter of the valve head. The tapered socket may be disposed in an end of the valve stem, defining an opening with a socket perimeter sized to receive a spring therein.

20 Claims, 4 Drawing Sheets

LOW HEAD TO STEM RATIO POPPET VALVE

CROSS-REFERENCE TO RELATED APPLICATIONS

This application claims priority to U.S. Provisional Patent Application having Ser. No. 61/781,655, which was filed Mar. 14, 2013. This priority application is hereby incorporated by reference in its entirety into the present application to the extent consistent with the present application.

BACKGROUND

This disclosure relates to poppet valves and, in particular, low head to stem ratio poppet valve bodies for use in compressor valves. Generally, a poppet valve is a valve including a hole for fluid flow and a plug or valve body, usually a disk shaped head formed at the end of a shaft or stem. The stem may guide the head to seal against the hole. Some poppet valves include springs to provide sealing force and some rely on pressure differential between the two sides of the head. Other poppet valves may be actuated by solenoid and/or another actuator.

The design of a poppet valve body may affect several aspects of the operation of a poppet valve. For example, the shape may affect the fluid dynamics through the valve including seal effectiveness, pressure drop, and operational costs. Typical fluid flow calculations represent the resistance caused by a fitting and/or component in a system with a dimensionless coefficient K, where a higher K value indicates higher resistance to fluid flow. In addition, the design of the valve body may affect its reliability, maintenance frequency and/or difficulty, complexity and costs of manufacturing, and/or difficulty of installation.

There is a continuing need, therefore, for more efficient and reliable poppet valves for use in rotating machinery, such as compressors.

SUMMARY

Embodiments of the disclosure may provide a valve member for a poppet valve. The valve member may include a cylindrical valve stem, a valve head, a circular face formed on the valve head, a sealing surface disposed between the circular face and the perimeter of the valve head, a tapered socket, and a bevel. The cylindrical valve stem may include a first end and a second end and an outside surface defining a stem diameter. The valve head may include a maximum diameter defining a guard area of the valve head. The maximum diameter of the valve head may be greater than the stem diameter. The circular face may be formed on the valve head opposite the valve stem, and have a perimeter and a face diameter. The sealing surface may include a rounded transition ring disposed between the perimeter of the circular face and the maximum diameter of the valve head. The tapered socket may be disposed in the second end of the cylindrical valve stem, defining an opening with a socket perimeter configured to receive a spring therein. The bevel may provide an angle from the socket perimeter to the outside surface of the cylindrical valve stem.

Embodiments of the disclosure may further provide a valve for regulating the flow of a fluid. The valve may include an inlet channel configured to accept the fluid into the valve, a hole with a seating surface disposed around a perimeter of the hole, a valve member, a guide pocket, a spring, and an outlet channel. The inlet channel may terminate in the hole. The valve member may include a cylindrical valve stem, a valve head, a circular face formed on the valve head, a sealing surface disposed between the face and the perimeter of the valve head, a tapered socket, and a bevel. The cylindrical valve stem may include a first end and a second end and an outside surface defining a stem diameter. The valve head may include a maximum diameter defining a guard area of the valve head. The maximum diameter of the valve head may be greater than the stem diameter. The circular face may be formed on the valve head opposite the cylindrical valve stem, and have a perimeter and a face diameter. The sealing surface may include a rounded transition ring disposed between the perimeter of the circular face and the maximum diameter of the valve head. The tapered socket may be disposed in the second end of the cylindrical valve stem, defining an opening with a socket perimeter configured to receive a spring therein. The bevel may provide an angle from the socket perimeter to the outside surface of the cylindrical valve stem. The guide pocket may include a bottom surface, the guide pocket holding the valve stem and allowing movement along the longitudinal axis of the valve member. The spring may be disposed in the tapered socket of the valve member and rest against the bottom surface of the guide pocket. The spring may exert a force against the valve member to keep the sealing surface of the valve member in contact with the seating surface of the inlet channel. The outlet channel may be in fluid communication with the inlet channel when the spring is compressed and the valve member recedes into the guide pocket.

Embodiments of the disclosure may further provide a compressor including a crankshaft driving a piston, the piston translating within a compression cylinder, and a valve configured to restrict fluid flow out of the compression cylinder. The valve may include an inlet channel disposed to receive fluid flow out of the cylinder, a hole with a seating surface disposed around a perimeter of the hole, a valve member, a guide pocket, a spring, and an outlet channel. The inlet channel may terminate in the hole. The valve member may include a valve stem, a valve head, a circular face disposed on the valve head, a sealing surface disposed between the circular face and the perimeter of the valve head, a tapered socket, and a bevel. The cylindrical valve stem may include a first end and a second end and an outside surface defining a stem diameter. The valve head may include a maximum diameter defining a guard area of the valve head. The maximum diameter of the valve head may be greater than the stem diameter. The circular face may be disposed on the valve head opposite the valve stem, and have a perimeter and a face diameter. The sealing surface may include a rounded transition ring disposed between the perimeter of the face and the maximum diameter of the valve head. The tapered socket may be disposed in the second end of the valve stem, defining an opening with a socket perimeter configured to receive a spring therein. The bevel may provide an angle from the socket perimeter to the outside surface of the cylindrical valve stem. The guide pocket may include a bottom surface, the guide pocket holding the cylindrical valve stem and allowing movement along the longitudinal axis of the valve member. The spring may be disposed in the tapered socket of the valve member and rest against the bottom surface of the guide pocket. The spring may exert a force against the valve member to keep the sealing surface of the valve member in contact with the seating surface of the inlet channel. The outlet channel may be in fluid communication with the inlet channel when the spring is compressed and the valve member recedes into the guide pocket.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Figure 1:
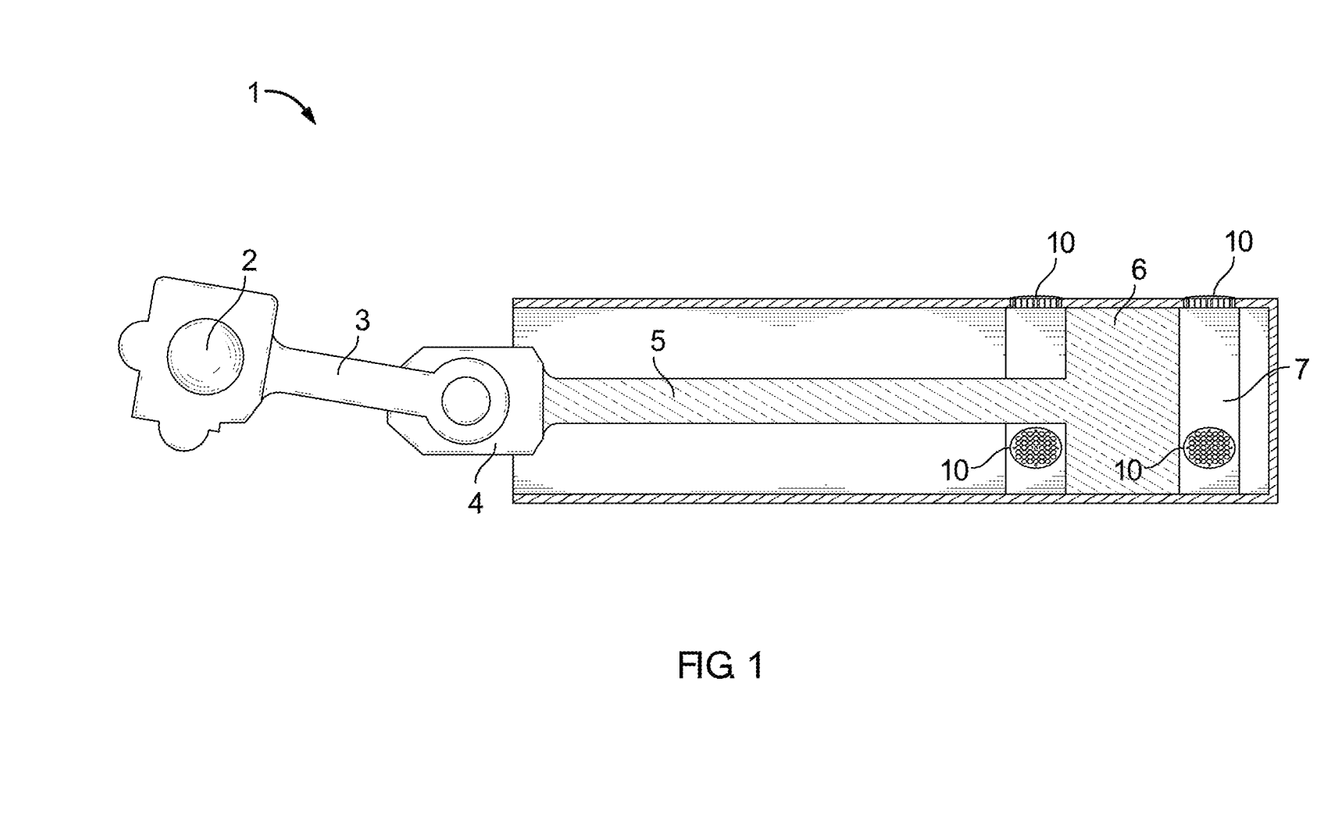
FIG. 1 illustrates an example compressor including a valve according to the teachings of the present disclosure.

FIG. 1 illustrates an example compressor 1 including a valve 10 according to the teachings of the present disclosure. More particularly, as shown in FIG. 1, the compressor 1 may include a plurality of valves 10. The compressor 1 in FIG. 1 may include a crankshaft 2 with a driving rod 3 driving a piston rod 5. The driving rod 3 may be connected to the piston rod 5 by a crosshead 4. The piston rod 5 may be rigidly connected to a piston head 6 disposed at least partially within a piston chamber 7. One or more of the valves 10 may be arrayed around the piston chamber 7, regulating fluid flow in and/or out of the piston chamber 7.

Figure 2:
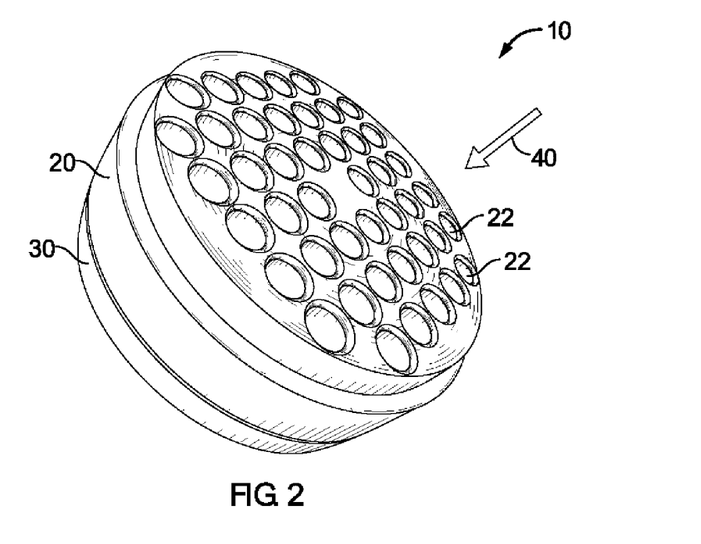
FIG. 2 illustrates an example valve which may be used in a compressor according to the teachings of the present disclosure.

FIG. 2 illustrates an example valve 10 which may be used in a compressor, such as the compressor 1 of FIG. 1. The valve 10 may include a valve body including an inlet side 20 and an outlet side 30. Flow through the valve 10 may be in the direction indicated by arrow 40. Some embodiments of the valve 10 may be referred to as a "pressure-relief valve" and/or a "check valve."

The term "valve body" may be used to refer to the outer casing of the valve 10 that contains various working portions. As shown at least in the exemplary embodiment of FIG. 2, the valve body may include two parts, the inlet side 20 and the outlet side 30. In at least one embodiment, the valve body may be formed from the inlet side 20 and the outlet side 30. The inlet and outlet sides 20, 30 may include a variety of materials chosen based on the application for the valve 10. For example, the inlet and outlet sides 20, 30 may include metal or plastic. In applications with a corrosive fluid, e.g., seawater, acid, and/or high temperature fluids, the materials may be chosen to resist those corrosive properties.

Figure 3:
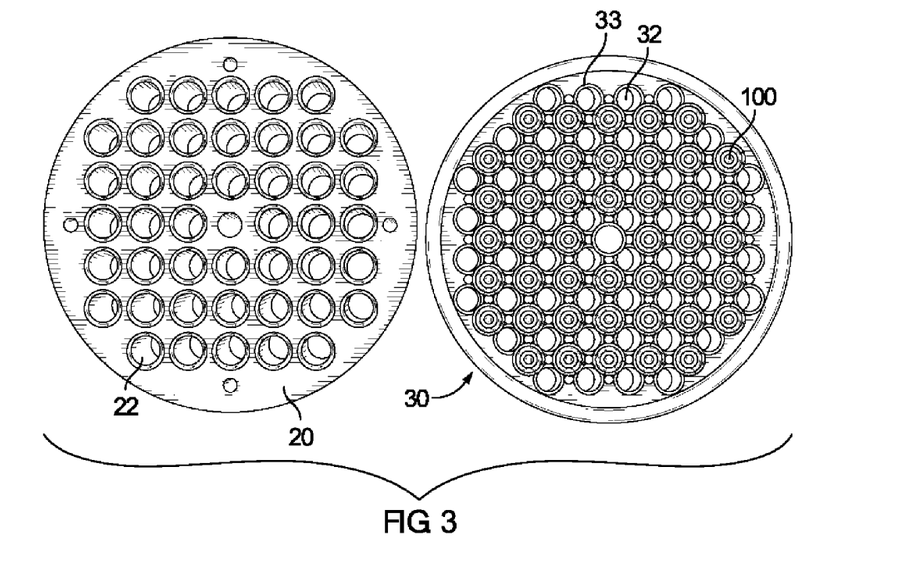
FIG. 3 illustrates a partial disassembly of an example valve, according to the teachings of the present disclosure.

As shown in FIG. 2, and more clearly in FIG. 3, the outlet side 30 may include one or more outlet holes 32. As shown by the arrow 40, fluid may flow from the inside of the valve 10 to the outside of the valve 10 through the outlet holes 32. The arrangement of the outlet holes 32 may be chosen based on fluid dynamic properties desired for the valve 10. For example, the number, size, and spacing of the outlet holes 32 may vary depending on expected fluid pressure, volume flow rate, etc. In some embodiments, the outlet holes 32 may include shaped edges 33 to reduce entrance and/or exit losses for fluids exiting the valve 10. The teachings of the present disclosure may be used in valves with one outlet hole 32 as well as valves with a plurality and/or array of outlet holes 32, as shown in FIG. 3.

Likewise, in an exemplary embodiment, the valve 10 may include a plurality of inlet holes 22 (shown in FIGS. 2 and 3) arrayed in the inlet side 20 of the body. As shown by the arrow 40 (shown in FIGS. 2 and 4), fluid may flow into the valve 10 through the inlet holes 22. An arrangement of the inlet holes 22 may be chosen based on the fluid dynamic properties desired for the valve 10. For example, the number, size, and spacing of the inlet holes 22 may vary depending on expected fluid pressure, volume flow rate, etc. In some cases, the inlet holes 22 may include rounded edges 24 (shown in FIG. 4) to reduce entrance losses for fluids entering the valve 10. Although the valve 10, as illustrated in FIGS. 2 and 3, includes a plurality of inlet holes 22; embodiments in which the valve 10 includes one inlet hole 22 are contemplated herein.

The inlet hole 22 may include exit edges 26 (shown in FIG. 5) disposed around the exit and/or end of the respective inlet hole 22. In one or more embodiments, the exit edges 26 may include a seat and/or rounded edges used for forming a seal with internal portions of the valve 10.

FIG. 3 illustrates a partial disassembly of an exemplary embodiment of the valve 10. As depicted in FIG. 3, the fluid may flow into the valve body through the inlet holes 22 in the inlet side 20 to reach the interior of the valve 10. Each inlet hole 22 may provide access for the fluid to impinge against a valve member 100 when the valve body is fully assembled. As shown in FIG. 3, if the inlet side 20 is placed on top of the outlet side 30, each inlet hole 22 would correspond to a single valve member 100. The outlet holes 32 may be arrayed between and/or around the array of valve members 100.

Figure 4:
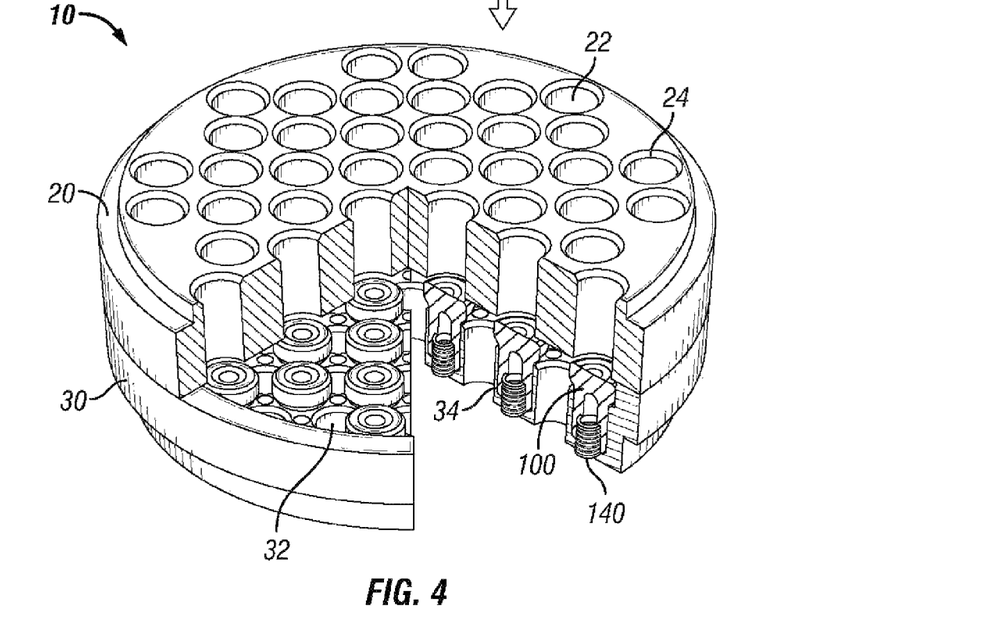
FIG. 4 illustrates an isometric view of an example valve, with portions removed for visibility, according to the teachings of the present disclosure.

FIG. 4 illustrates an isometric view of an exemplary embodiment of the valve 10, with portions removed for visibility, according to the present disclosure. The valve 10 may include a plurality of valve members 100 arrayed within the valve body. In some embodiments, such as that shown in FIG. 4, an array of valve members 100 may correspond to the array of inlet holes 22. Each valve member 100 may be mounted in a guide pocket 34 in the outlet side 30 of the valve body. The valve 10 may also include a plurality of springs 140, such that a spring 140 of the plurality of springs 140 may be disposed between each valve member 100 and the respective guide pocket 34. In the arrangement shown in FIG. 4, fluid flow in the direction of arrow 40 may enter the valve 10 through the inlet holes 22, impinging on the respective valve members 100, and may exit the valve 10 through the exit holes 32.

Figure 5:
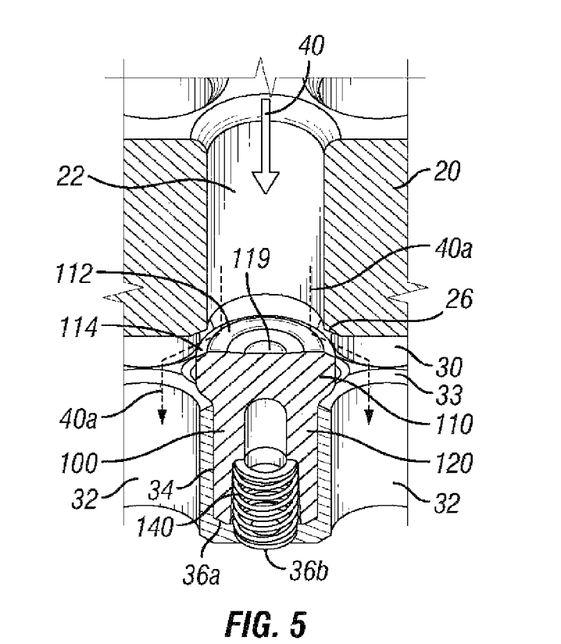
FIG. 5 is a cross section view of an example valve, showing a single valve member and associated portions of the valve according to the teachings of the present disclosure.

FIG. 5 is a cross section view of an exemplary embodiment of the valve 10, showing a single valve member 100 and associated portions of the valve 10, according to the present disclosure. The portion of the valve 10 shown includes both the inlet side 20 and the outlet side 30 of the valve body. As shown in FIG. 5, the valve member 100 may be mounted in the guide pocket 34 of the outlet side 30. The spring 140 may be disposed between the valve member 100 and the bottom 36a, 36b of the guide pocket 34.

The valve member 100 may include various features and/or components. For example, the valve member 100 shown in FIG. 5 may include a valve head 110 and a valve stem 120. The valve head 110 may include a disk having a face 112 and a sealing surface 114. The sealing surface 114 of the valve member 100 may come in contact with the exit edges 26 of the inlet holes 22. The exit edges 26 of the inlet holes may be referred to as a "seat." The seat may provide a contact surface for the sealing surface 114 of the valve member 100. When the sealing surface 114 of the valve member is pressed against the exit edges 26 of the inlet hole 22, the valve 10 resists fluid flow through that particular inlet hole 22.

In FIG. 5, the valve 10 is shown in an "open" state. In an open state, the spring 140 may be compressed, allowing the valve member 100 to recede into the guide pocket 34. When the valve member 100 recedes into the guide pocket 34, the sealing surface 114 is no longer in contact with the exit edges 26 of the inlet hole 22 and the fluid may flow through the inlet hole 22, impinging the face 112, past the sealing surface 114, over the shaped edges 33 of the outlet holes 32, and eventually out of the outlet holes 32, as shown by dotted flow lines 40a.

The design of the valve member 100 and other components of the valve 10 may affect various aspects of the operation of the valve 10. The valve 10 may be described by its efficiency, including pressure losses for fluid flowing through the valve 10, and/or by its sealing effectiveness. The design of various components of the valve 10 may affect its reliability, ease and/or frequency of repair, and/or costs and complexity of manufacturing.

Various aspects of the valve member 100 and other components in the flow path of the fluid may define the efficiency of the valve 10. For example, the impingement of the fluid on the face 112 of the valve member 100 will create a pressure loss. The shape of the face 112 and the sealing surface 114 of the valve head 100 affects the total resistance of the valve 10 to fluid flow through the valve 10. As another example, the extent to which the valve head 110 overlaps and/or obstructs the exit holes 32 may provide additional resistance to fluid flow through the valve 10.

Increasing the area of the sealing surface 114 in contact with the seat or exit edges 26 of the inlet holes 22 may increase the sealing effectiveness of the valve 10. In some embodiments, increasing the contact area may increase the sealing effectiveness but also may increase the pressure losses related to fluid flow out of the inlet holes 22 and across the face 112 and/or sealing surface 114 of the valve head 110.

Using the teachings of the present disclosure to decrease the pressure losses of fluid flowing through the valve 10 may improve several aspects of the larger system which includes the valve 10 (e.g., the compressor 1). As an example, a valve 10 with a reduced K value may reduce the cost of operation of the system by reducing the overall energy consumption. As another example, a valve 10 with a lower K value may lower the internal cylinder pressure required before the valve body 100 is activated and/or "opened," thereby extending the service life of the cylinder and/or other system components.

The reliability of the valve 10 may depend, at least in part, on the reliability of the valve member 100. In particular embodiments of the valve member 100, the reliability may be improved by choosing the relative dimensions so that the valve member 100 stays in compression throughout the operational cycle of the valve 10. For example, the bottom of valve stem 120 undergoes impact against the bottom 36a, 36b of guide pocket 34 upon opening, and the sealing surface 114 of the valve head 110 undergoes impact against the seat 26 upon closing. Maintaining the valve member 100 in compression during the various impacts and/or during differential pressure loading may extend the life span of the valve member 100, reducing the need for maintenance and/or replacement of the valve 10.

Figure 6:
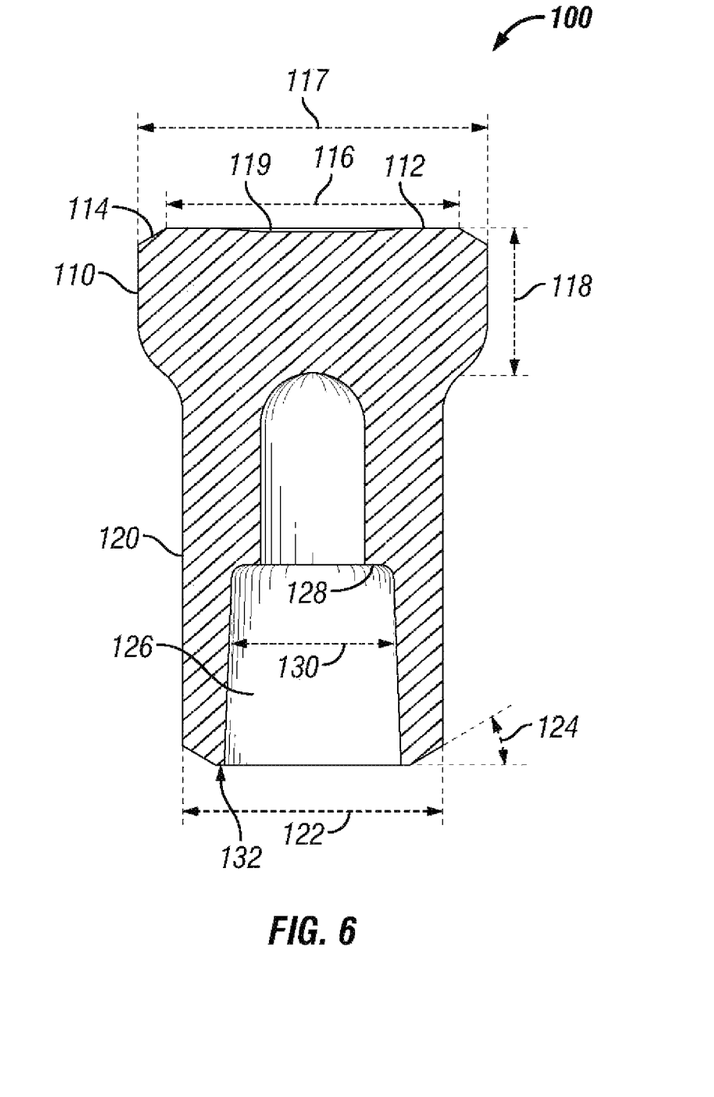
FIG. 6 is a cross section view of an example valve member according to the teachings of the present disclosure.

FIG. 6 is a cross section view of an example valve member 100 according to the present disclosure. The valve member 100 may include the valve head 110 disposed on one end of the valve stem 120.

The valve head 110 may include the face 112 and the sealing surface 114. The valve head 110 may include a disk or another shape. The valve head 110 may include a circular disk defining a maximum head diameter 117. The shape of the valve head 110 may define a head thickness 118. A ratio of the head thickness 118 to the maximum head diameter 117 or "head thickness to head diameter ratio" may affect the stresses placed on the valve member 100 during operation of the valve 10. For example, a relatively low head thickness to head diameter ratio may place portions of the valve member 100 under tensile stress. According to the present disclosure, a higher ratio may serve to maintain relevant portions of the valve member 100 under compression rather than tension. Reducing and/or eliminating tensile stresses may increase the reliability and/or durability of the valve member 100.

The ratio of head thickness to head diameter for some valve members known in the art is about 0.3. According to the teachings of the present disclosure, valve member 100 may have a ratio of head thickness 118 to head diameter 117 of more than about 0.34. In particular embodiments, the valve member 100 may have a ratio of head thickness 118 to head diameter 117 of about 0.446.

The face 112 may be formed on the opposite side of the valve head 110 from the valve stem 120. The valve face 112 may include a circular surface defining a face diameter 116 and having a perimeter. In the example valve member 100 shown, the face diameter 116 may be less than the maximum head diameter 117. The sealing surface 114 may include a rounded transition between the perimeter of the face 112 and the maximum head diameter 117. In particular embodiments, the sealing surface 114 may include a round arc with a constant radius.

In some embodiments, the face 112 may include a concave depression 119. The concave depression may be centered on the face 112. The concave depression 119 may reduce pressure losses in the fluid flowing through the valve 10 by reducing pressure losses for the fluid impacting the face 112 and/or the fluid flowing across the face 112 to the sealing surface 114.

Valve bodies known in the art create pressure drops and/or losses based on the shape of the entrance into the inlet holes. A valve seat entrance loss coefficient K value can be of about 0.5. According to the teachings of the present disclosure, the inlet side 20 of the valve body may include rounded edges 24, which contribute to reducing the K value of the valve 10 to around 0.03.

The valve stem 120 may include a hollow cylindrical member with a socket 126. The valve stem 120 may have an outer diameter which may be called the stem diameter 122. The ratio of maximum head diameter 117 to stem diameter 122 or "head to stem ratio" may, at least in part, define some aspects of the efficiency of the valve 10. For example, a relatively low head to stem ratio may reduce any overlap of the exit holes 32 in the outlet side 30 of the valve 10. Reducing any overlap of the exit holes 32 may increase the effective flow area associated with the exit holes 32. At the same time, however, a lower head diameter may reduce the available "seating area" for the valve member 100. Reduced seating area may increase the rate of leakage and/or decrease the effectiveness of the valve 10.

The head to stem ratio for some valve members known in the art is around 1.75 or 1.78. According to the teachings of the present disclosure, the valve member 100 may have a head to stem ratio lower than 1.47. An example embodiment of the valve member 100 may have a head to stem ratio of 1.344.

The socket 126 of the valve stem 120 may define an opening with a perimeter 132 to receive the spring 140. The socket 126 may include a spring landing 128 for one end of the spring 140 opposite the bottom 36a, 36b of the guide pocket 34. The socket 126 may include a round hole tapering from the perimeter 132 to the spring landing 128, with a diameter 130. A tapered hole may provide for simpler installation of the spring 140 (FIG. 5), reduced stresses on the valve stem during operation, reduced wear, and/or other benefits.

The valve stem 120 may also include a bevel from the perimeter 132 of the socket 126 to the exterior of the valve stem 120. As shown in FIG. 6, the bevel of the valve stem 120 may be represented by a bevel angle 124. The bevel may put the valve stem 120 in compression upon impact with the bottom 36a, 36b of the guide pocket 34.

In some embodiments, the bottom 36a, 36b of the guide pocket 34 may include two portions, as shown in FIG. 5. The bottom 36a, 36b of the guide pocket 34 shown therein includes a flat center 36b under the spring 140 and a chamfered edge 36a in contact with the bevel of the valve stem 120. A chamfer angle of the edge 36a may affect the stresses exerted on the valve stem 120 upon opening impact. For example, a steeper angle may provide a compressive load toward the center of the valve stem 120, while a shallow angle may not provide any compressive load toward the center of the valve stem 120.

The relationship between the bevel angle 124 of the valve member 100 and the chamfer angle of the edge 36a of the guide pocket 34 may affect the stresses on the valve stem 120. For example, if the chamfer angle of edge 36a is slightly steeper than the bevel angle 124 of the valve stem 120, the impact of the valve stem upon the bottom 36a, 36b of the guide pocket 34 will occur near the outer diameter 122 of the valve stem 120. If the impact is closer to the outer diameter 122, the stresses on the valve stem 120 will tend to be compressive rather than tensile.

According to the teachings of the present disclosure, some embodiments of the valve 10 may include a valve member 100 with a bevel angle 124 in the range of about 20 degrees to about 40 degrees. In an exemplary embodiment, the bevel angle 124 may be in the range of about 29.25 degrees to about 30.25 degrees. A chamfer angle of the edge 36a of the bottom 36a, 36b of the guide pocket 34 may be in the range of about 30.0 degrees to about 30.5 degrees. The example tolerance range may provide the effects described above resulting in increased compressive loading on the valve stem instead of tensile stresses which occur in the valve members known in the art.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

We claim:

1. A valve member for a poppet valve, comprising:
a cylindrical valve stem with a first end and terminating in a second end axially opposing the first end along a longitudinal axis, the cylindrical valve stem having an outside surface defining a stem diameter;
a valve head disposed at the first end of the cylindrical valve stem, the valve head having a maximum diameter defining a guard area of the valve head, the maximum diameter of the valve head greater than the stem diameter;
a circular face formed on the valve head opposite the cylindrical valve stem, the circular face having a perimeter and a face diameter;
a sealing surface disposed around the perimeter of the circular face, the sealing surface including a rounded transition ring disposed between the perimeter of the circular face and the maximum diameter of the valve head;
a socket having a socket diameter and extending from the second end of the cylindrical valve stem, the socket defining an opening at the second end with a socket perimeter configured to receive a spring therein, and the socket diameter tapering from the socket perimeter to a spring landing of the cylindrical valve stem configured to seat the spring; and
a bevel from the socket perimeter to the outside surface of the cylindrical valve stem.

2. A valve member according to claim 1, further comprising a concave depression substantially centered in the circular face about the longitudinal axis of the cylindrical valve stem.

3. A valve member according to claim 1, wherein the rounded transition ring of the sealing surface comprises an arc with a constant radius.

4. A valve member according to claim 1, further comprising a ratio of the maximum diameter of the valve head to the stem diameter of less than about 1.47.

5. A valve member according to claim 1, further comprising a ratio of the maximum diameter of the valve head to the stem diameter of less than about 1.35.

6. A valve member according to claim 1, wherein the bevel includes an angle of about 20 degrees to about 40 degrees.

7. A valve member according to claim 1, further comprising a ratio of a thickness of the valve head to the maximum diameter of the valve head of more than about 0.34.

8. A valve member according to claim 1, further comprising a ratio of a thickness of the valve head to the maximum diameter of the valve head of more than about 0.445.

9. A valve member according to claim 1, further comprising:
- a concave depression substantially centered in the circular face about the longitudinal axis of the cylindrical valve stem;
- a ratio of the maximum diameter of the valve head to the stem diameter of less than 1.35; and
- a ratio of a thickness of the valve head to the maximum diameter of the valve head of more than about 0.445,
- wherein the bevel includes an angle of about 20 degrees to about 40 degrees; and
- wherein the rounded transition ring of the sealing surface comprises an arc with a constant radius.

10. A valve for regulating the flow of a fluid, comprising:
an inlet channel configured to accept the fluid into the valve, the inlet channel terminating in a hole with a seating surface disposed around a perimeter of the hole;
a valve member comprising:
- a cylindrical valve stem with a first end and terminating in a second end axially opposing the first end along a longitudinal axis;
- an outside surface of the cylindrical valve stem defining a stem diameter;
- a valve head disposed at the first end of the cylindrical valve stem, the valve head having a maximum diameter defining a guard area of the valve head, the maximum diameter of the valve head greater than the stem diameter;
- a circular face formed on the valve head opposite the cylindrical valve stem, the circular face having a perimeter and a face diameter;
- a sealing surface disposed around the perimeter of the circular face, the sealing surface including a rounded transition ring disposed between the perimeter of the circular face and the maximum diameter of the valve head;
- a socket having a socket diameter and extending from the second end of the cylindrical valve stem, the socket defining an opening at the second end with a socket perimeter configured to receive a spring therein, and the socket diameter tapering from the socket perimeter to a spring landing of the cylindrical valve stem configured to seat the spring; and
- a bevel from the socket perimeter to the outside surface of the cylindrical valve stem;
a guide pocket with a bottom surface, the guide pocket holding the cylindrical valve stem and allowing movement along the longitudinal axis of the valve member;
a spring disposed in the socket of the valve member and resting against the bottom surface of the guide pocket, the spring exerting a force against the spring landing of the valve member pushing the sealing surface of the valve member toward the seating surface of the inlet channel; and
an outlet channel in fluid communication with the inlet channel when the spring is compressed and the valve member recedes into the guide pocket.

11. A valve according to claim 10, further comprising a concave depression substantially centered in the circular face about the longitudinal axis of the valve stem.

12. A valve according to claim 10, wherein the rounded transition ring of the sealing surface comprises an arc with a constant radius.

13. A valve according to claim 10, further comprising a ratio of the maximum diameter of the valve head to the stem diameter of less than about 1.47.

14. A valve according to claim 10, further comprising a ratio of the maximum diameter of the valve head to the stem diameter of less than about 1.35.

15. A valve according to claim 10, wherein the bevel includes an angle of about 20 degrees to about 40 degrees.

16. A valve according to claim 10, further comprising a ratio of a thickness of the valve head to the maximum diameter of the valve head of more than about 0.34.

17. A valve according to claim 10, further comprising a ratio of a thickness of the valve head to the maximum diameter of the valve head of more than about 0.445.

18. A valve according to claim 10, further comprising:
- a concave depression substantially centered in the circular face about the longitudinal axis of the valve stem;
- a ratio of the maximum diameter of the valve head to the stem diameter of less than about 1.35; and
- a ratio of a thickness of the valve head to the maximum diameter of the valve head of more than about 0.445;
- wherein the bevel includes an angle of about 20 degrees to about 40 degrees; and
- wherein the rounded transition ring of the sealing surface comprises an arc with a constant radius.

19. A valve according to claim 10, wherein the bottom surface of the guide pocket includes:
- a central flat portion providing a surface for one end of the spring; and
- a chamfered slope disposed between the central flat portion and a wall of the guide pocket;
- wherein the chamfered slope includes an angle of about zero degrees to about 1.5 degrees steeper than a bevel angle of the valve member.

20. A compressor comprising:
a crankshaft driving a piston, the piston translating within a compression cylinder; and
a valve configured to restrict fluid flow out of the compression cylinder, the valve comprising:
an inlet channel configured to receive a fluid exiting the compression cylinder, the inlet channel terminating in a hole with a seating surface disposed around a perimeter of the hole;
a valve member comprising:
- a cylindrical valve stem with a first end and terminating in a second end axially opposing the first end along a longitudinal axis;
- an outside surface of the cylindrical valve stem defining a stem diameter;
- a valve head disposed at the first end of the cylindrical valve stem, the valve head having a maximum diameter defining a guard area of the valve head, the maximum diameter of the valve head greater than the stem diameter;

a circular face formed on the valve head opposite the cylindrical valve stem, the circular face having a perimeter and a face diameter;

a sealing surface disposed around the perimeter of the circular face, the sealing surface comprising a rounded transition ring disposed between the perimeter of the circular face and the maximum diameter of the valve head;

a socket having a socket diameter and extending from the second end of the cylindrical valve stem, the socket defining an opening at the second end with a socket perimeter configured to receive a spring therein, and the socket diameter tapering from the socket perimeter to a spring landing of the cylindrical valve stem configured to seat the spring; and a bevel from the socket perimeter to the outside surface of the cylindrical valve stem;

a guide pocket with a bottom surface, the guide pocket holding the cylindrical valve stem and allowing movement along the longitudinal axis of the valve member;

a spring disposed in the socket of the valve member and resting against the bottom surface of the guide pocket, the spring exerting a force against the spring landing of the valve member to keep the sealing surface of the valve member in contact with the seating surface of the inlet channel; and an outlet channel in fluid communication with the inlet channel when the spring is compressed and the valve member recedes into the guide pocket.

* * * * *